United States Patent
Bang

(10) Patent No.: US 10,148,045 B2
(45) Date of Patent: Dec. 4, 2018

(54) PLUG UNIT FOR VEHICLE

(71) Applicants: Hyundai Motor Company, Seoul (KR); Kia Motors Corporation, Seoul (KR)

(72) Inventor: Jun Ho Bang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 108 days.

(21) Appl. No.: 15/340,648

(22) Filed: Nov. 1, 2016

(65) Prior Publication Data

US 2017/0358892 A1    Dec. 14, 2017

(30) Foreign Application Priority Data

Jun. 8, 2016 (KR) .................. 10-2016-0071187

(51) Int. Cl.
  *H01R 13/713* (2006.01)
  *B60L 11/18* (2006.01)
  *H01R 29/00* (2006.01)

(52) U.S. Cl.
  CPC ........ *H01R 13/713* (2013.01); *B60L 11/1818* (2013.01); *H01R 29/00* (2013.01); *B60L 2230/12* (2013.01)

(58) Field of Classification Search
  CPC ... H01R 13/713; H01R 29/00; B60L 11/1818; B60L 2230/12
  See application file for complete search history.

(56) References Cited

U.S. PATENT DOCUMENTS 5,674,098 A * 10/1997 Inaba .................. H01H 9/085
439/205

FOREIGN PATENT DOCUMENTS

| KR | 10-2010-0080218 A | 7/2010 |
| KR | 10-2012-0015820 A | 2/2012 |
| KR | 10-2012-0037155 A | 4/2012 |
| KR | 10-2013-0051360 A | 2/2013 |
| KR | 2015-0003571 U | 10/2015 |

* cited by examiner

*Primary Examiner* — Robert Deberadinis
(74) *Attorney, Agent, or Firm* — Mintz Levin Cohn Ferris Glovsky and Popeo, P.C.; Peter F. Corless

(57) ABSTRACT

A plug unit for a hybrid vehicle is provided. The plug unit includes a low voltage plug connected to or disconnected from a low voltage circuit formed by a low voltage battery and a low voltage component, and allows a current to flow between the low voltage battery and the low voltage component when the low voltage plug is connected to the circuit. A high voltage plug connected to or disconnected from a high voltage circuit formed by a high voltage battery and a high voltage component, and allows a current to flow between the high voltage battery and the high voltage component when the high voltage plug is coupled to the circuit. Further, a main base having the high voltage plug mounted thereon, allows current flow in the circuits when the base is mounted and obstructs the current flowing in the high voltage circuit when the base is demounted.

15 Claims, 4 Drawing Sheets

PLUG UNIT FOR VEHICLE

CROSS REFERENCE TO RELATED APPLICATION

The present application claims priority to Korean Patent Application No. 10-2016-0071187, filed Jun. 8, 2016, the entire contents of which is incorporated herein for all purposes by this reference.

BACKGROUND

Field of the Invention

The present invention relates generally to a plug unit for a vehicle, and more particularly, to a plug unit that obstructs battery power to prevent electric shock attributed to the battery during maintenance of the vehicle having a motor generating driving force.

Description of the Related Art

Recently, attempts have been made to replace a 12 V lead-acid battery, which is used for vehicle auxiliary power, with a lithium ion battery that has improved power/energy density and charging/discharging efficiency. However, the lithium ion battery has increased material costs compared to the 12 V lead-acid battery. To minimize the increase in material costs, an integrated packed that includes a 12 V lithium ion battery is disposed within a high voltage battery system of a hybrid vehicle, a plug-in hybrid electric vehicle, or a battery powered electric vehicle (hereinafter, referred to as electric vehicle). Moreover, a battery management system (BMS) for high voltage is configured to provide a management function for the 12 V lithium ion battery and includes an integrated cooling structure.

In particular, the high voltage battery system integrating the 12 V lithium ion battery is mounted beneath rear seats of the vehicle to maintain use of a vehicle trunk. Accordingly, the 12 V lithium ion battery is difficult to access. Further, it is difficult for a mechanic to perform maintenance on the vehicle since the rear seats are required to be detached to obstruct the power of the 12 V lithium ion battery.

The foregoing is intended merely to aid in the understanding of the background of the present invention, and is not intended to mean that the present invention falls within the purview of the related art that is already known to those skilled in the art.

SUMMARY

The present invention provides a plug unit for a vehicle, that utilizes high voltages may include a ground line cutoff function for a 12 V auxiliary battery and simultaneously may obstruct power of a high voltage circuit and a low voltage circuit by demounting the plug unit from the vehicle during maintenance of the vehicle to improve the safety of a mechanic and the work efficiency.

In one aspect of the present invention, a plug unit for a vehicle may include a low voltage plug detachable from a low voltage circuit having a low voltage battery and a low voltage component of the vehicle and configured to allow an electric current to flow between the low voltage battery and the low voltage component when the low voltage plug is coupled to the low voltage circuit, a high voltage plug provided to be detachable from a high voltage circuit formed by a high voltage battery and a high voltage component of the vehicle configured to allow an electric current to flow between the high voltage battery and the high voltage component when the high voltage plug is connected to the high voltage circuit and a main base on which the high voltage plug is mounted, the base may be configured to provide the electric currents to flow in the high voltage circuit and in the low voltage circuit when the base is mounted in the vehicle and obstructs the electric current that flows in the high voltage circuit when the base is demounted from the vehicle.

The low voltage plug may be mounted on the base with the high voltage plug. For example, when the base is demounted from the vehicle the electric currents may be configured to be simultaneously obstructed from flowing in the high voltage circuit and in the low voltage circuit. The low voltage plug may include low voltage connection components connected to the low voltage circuit. The low voltage circuit may include a negative line that extends therefrom. The low voltage connection components may be disposed and connected between the low voltage battery and the negative line and may include the low voltage connection components configured to allow the electric current to flow in the low voltage circuit. Further, when the low voltage connection components are disconnected from the low voltage battery and the negative line, the electric current flowing in the low voltage circuit may be obstructed.

The high voltage circuit may include disconnected components and the low voltage circuit may include disconnected components. A housing may be disposed to surround both the disconnected components of the high voltage circuit and the disconnected components of the low voltage circuit. The base may be combined with or separated from the housing. Additionally, the base may include connection components that are respectively, electrically connected both to the high voltage circuit and to the low voltage circuit. In particular, when the plugs are connected to the housing, the connection components may be respectively disposed within and connected to the disconnected components of the circuits and may be configured to allow electric currents to flow in the circuits. The disconnected components of the circuits may be respectively disposed with insertion protrusions that protrude toward associated plugs. In addition, apertures may be respectively disposed within the interior of the insertion protrusions and the connection components may be respectively disposed within the apertures.

The low voltage plug may be a switch. For example, when the base is mounted in the vehicle, the switch may be turned on to allow the electric current to flow in the low voltage circuit. In other words, when the base is demounted from the vehicle, the switch may be turned off to obstruct the electric current from flowing in the low voltage circuit. The low voltage plug may be mounted at a low voltage base and may include low voltage connection components electrically connected to the low voltage circuit. The low voltage base may be disposed between the main base and disconnected components of the low voltage circuit. Therefore, when the main base is demounted from the vehicle, the low voltage base may be configured to allow the electric current to flow in the low voltage circuit. The main base may include a rotary shaft in a center thereof. The high voltage plug and the low voltage plug may be disposed perpendicular to each other based on the position of the rotary shaft and the low voltage plug may include a rotating member that protrudes in an upward direction from the main base. For example, the rotating member may be configured to rotate about the rotary shaft and the electric current flow in the low voltage circuit may be obstructed.

The high voltage plug may be disposed between a plurality of high voltage batteries coupled in series in the high voltage circuit. The high voltage plug may be disposed between the high voltage battery and the high voltage component. The high voltage plug may include high voltage connection components connected to the high voltage circuit. The high voltage circuit may include a positive line and a negative line that extend from the high voltage circuit. In particular, when the high voltage connection components are respectively connected to the positive line and the negative line, the high voltage connections components may be configured to allow the electric current to flow in the high voltage circuit. Further, when the high voltage connection components are disconnected from the positive line and the negative line, the electric current that flows in the high voltage circuit may be obstructed. The low voltage plug may be disposed between the low voltage battery and a ground.

According to the plug unit for the vehicle having the structure as described above, the plug unit may be disposed at a position where a mechanic has improved access to the plug unit during maintenance of the vehicle. For example, to protect the mechanic from electric shock caused by the high voltage battery, the high voltage plug that obstructs high voltage lines may be added to and modularized with the low voltage plug that obstructs the ground line of the 12 V auxiliary battery having relatively low voltage. Therefore, during the maintenance of the vehicle, the electric currents that flow in the high voltage circuit and the low voltage circuit may be simultaneously or selectively obstructed by enabling the mechanic to more simply demount the plug unit to enhance both the safety and work efficiency.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Hereinafter, the exemplary embodiment of the present invention will be described in detail with reference to the accompanying drawings to allow those skilled in the art to easily practice the present invention. Advantages and features of the present invention and methods for achieving the same will be clearly understood with reference to the following detailed description of embodiments in conjunction with the accompanying drawings. However, the present invention is not limited to the embodiments disclosed herein, but may be implemented in various different forms. The embodiments are merely given to make the disclosure of the present invention complete and to completely instruct the scope of the invention to those skilled in the art, and the present invention should be defined by the scope of the claims.

The terminology used herein is for the purpose of describing particular embodiments only and not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
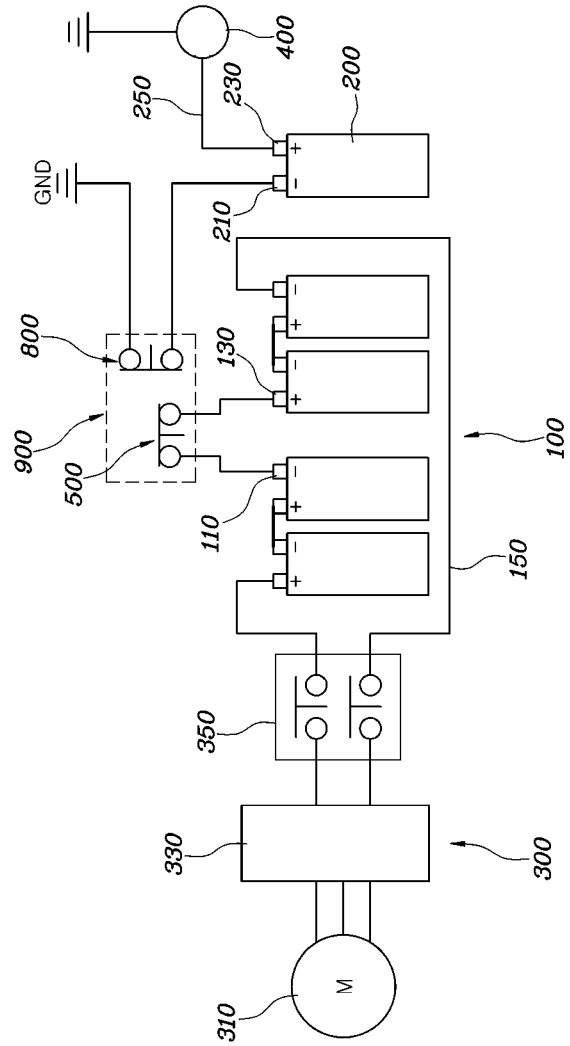
FIG. 1 is an exemplary view showing a battery system according to an exemplary embodiment of the present invention.
Figure 2:
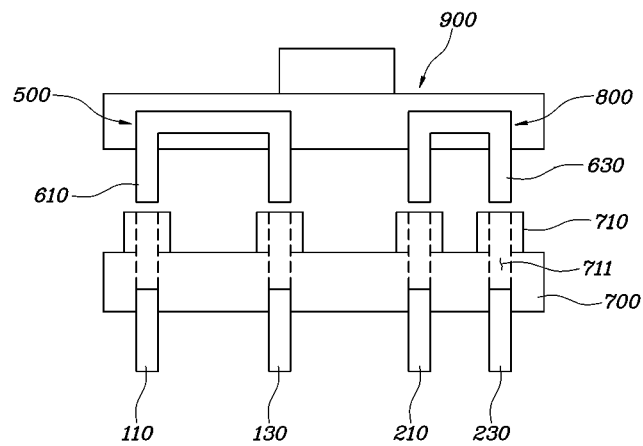
FIG. 2 is an exemplary view showing in detail a plug unit of FIG. 1 according to an exemplary embodiment of the present invention.
Figure 3:
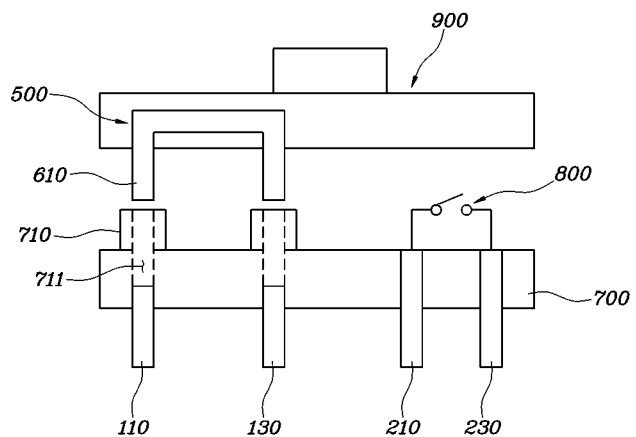
FIG. 3 is an exemplary view showing in detail a plug unit of FIG. 1 according to an exemplary embodiment of the present invention.
Figure 4:
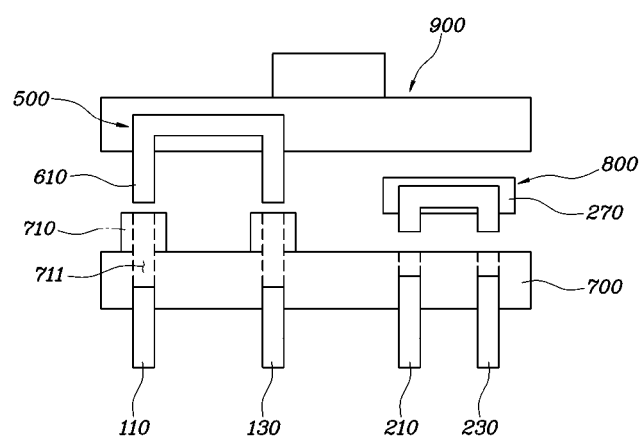
FIG. 4 is an exemplary view showing in detail a plug unit of FIG. 1 according to an exemplary embodiment of the present invention.
Figure 5:
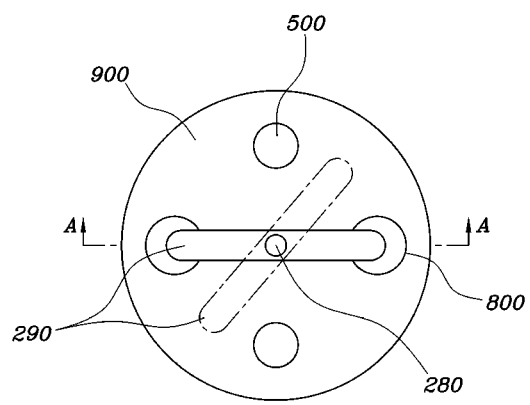
FIG. 5 is an exemplary view showing in detail a plug unit of FIG. 1 according to an exemplary embodiment of the present invention.
Figure 6:
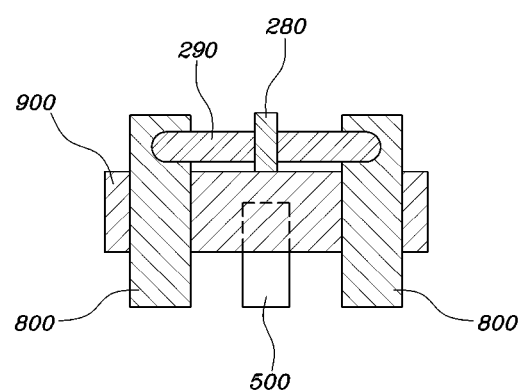
FIG. 6 is an exemplary sectional view taken along line A-A of FIG. 5 according to an exemplary embodiment of the present invention.

Hereinbelow, a plug unit for a vehicle according to the exemplary embodiments of the present invention will be described in detail with reference to the accompanying drawings. FIG. 1 is an exemplary view showing a battery system according to an exemplary embodiment of the present invention. FIG. 2 is an exemplary view showing in detail a plug unit of FIG. 1 according to an exemplary embodiment of the present invention. FIG. 3 is an exemplary view showing in detail a plug unit of FIG. 1 according to an exemplary embodiment of the present invention. FIG. 4 is an exemplary view showing in detail a plug unit of FIG. 1 according to an exemplary embodiment of the present invention. FIG. 5 is an exemplary view showing in detail a plug unit of FIG. 1 according to an exemplary embodiment of the present invention. FIG. 6 is an exemplary sectional view taken along line A-A of FIG. 5 according to an exemplary embodiment of the present invention.

Generally, battery systems of a hybrid vehicle, a plug-in hybrid electric vehicle, and an electric vehicle include a high voltage battery 100 and a low voltage battery 200. Specifically, the high voltage battery 100 may be connected to the low voltage battery 200, a driving motor 310, an inverter 330, and a power relay assembly (PRA) 350. The low voltage battery 200 may include a negative line 210 grounded to a vehicle body and a positive line 230 connected to electronic components of the vehicle. For example, when the electric vehicle is maintained, safety of mechanics may be ensured by obstructing power of the batteries with the plug unit.

According to an exemplary embodiment of the present invention, the plug unit for the vehicle may include a low voltage plug 800 connected to or disconnected (e.g., detachable) from a low voltage circuit 250 formed by a low voltage battery 200 and a low voltage component 400 of the vehicle. In particular, an electric current to flow between the low voltage battery 200 and the low voltage component 400 when the low voltage plug 800 is connected to the low voltage circuit 250. A high voltage plug 500 may be connected to or disconnected from a high voltage circuit 150 formed by a high voltage battery 100 and a high voltage component 300 of the vehicle. Accordingly, an electric current may be configured to flow between the high voltage battery 100 and the high voltage component 300 when the high voltage plug 500 is connected to the high voltage circuit 150. Further, a main base 900 on which the high voltage plug 500 is mounted, may be configured to allow the electric currents to flow in the high voltage circuit 150 and in the low voltage circuit 250 when the base 900 is mounted in the vehicle and may be configured to obstruct the electric current that flows in the high voltage circuit 150 when the base 900 is demounted from the vehicle.

According to the exemplary embodiments of the present invention, the high voltage plug 500 may be disposed between a plurality of high voltage batteries 100 connected in series in the high voltage circuit 150. The high voltage plug 500 may be disposed between the high voltage battery 100 and the high voltage electronic component 300. Therefore, when the high voltage plug 500 is disconnected from the high voltage battery 100 and the high voltage electronic component 300, an electric current that flows between the high voltage battery 100 and the high voltage electronic component 300 may be obstructed. In addition, the low voltage plug 800 may be disposed between the low voltage battery 200 and the ground (GND) provided as the negative line 210 of the low voltage battery 200. Therefore, when the low voltage plug 800 is disconnected from the low voltage battery 200 and the ground (GND), an electric current that flows between the low voltage battery 200 and the ground (GND) may be obstructed. Consequently, the electric current that flows between the low voltage battery 200 and the low voltage electronic component 400 may be obstructed.

Further, the high voltage plug 500 may include high voltage connection components 610 connected to the high voltage circuit 150. Furthermore, the high voltage circuit 150 may include a negative line 110 and a positive line 130 that extend from the high voltage circuit 150. The positive line 130 may be a positive terminal of the high voltage battery 100 and the negative line 110 may be a negative terminal of the high voltage battery 100. Alternatively, the positive line and the negative line may be electrical lines respectively that electrically extend from the positive terminal and the negative terminal. The high voltage connection components 610 may be connected to the negative line 110 and the positive line 130 to provide the high voltage connection components 610 with an electric current that flows in the high voltage circuit 150. When the high voltage connection components 610 are disconnected from the negative line and the positive line, the electric current that flows in the high voltage circuit 150 may be obstructed.

The low voltage plug 800 may include low voltage connection components 630 connected to the low voltage circuit 250. In addition, the low voltage circuit 250 may include a negative line 210 that extends from the low voltage circuit 250. The negative line 210 may be a ground line, or a negative terminal of the low voltage battery 200, or an electrical line electrically connected to the negative terminal. The low voltage connection components 630 are respectively connected to the low voltage battery 200 and the negative line 210 and the low voltage connection components may be configured to allow an electric current to flow in the low voltage circuit 250. When the low voltage connection components 630 are disconnected from the low voltage battery and the negative line, the electric current that flows in the low voltage circuit 250 may be obstructed.

Further, the high voltage circuit 150 may include disconnected components and the low voltage circuit 250 may include disconnected components. For example, a first disconnected component of the high voltage circuit 150 may include a line that extends from the positive line 130 of the high voltage battery 100. A second of the disconnected component of the high voltage circuit 150 may include a line that extends from the negative line 110 of the high voltage battery 100. In particular, a disconnected component of the low voltage circuit 250 may include a line that extends from the ground (GND) that is the negative line 210 of the low voltage battery. The disconnected components of the high voltage circuit 150 and the disconnected components of the low voltage circuit 250 may be disposed within a housing 700 that surrounds both the disconnected components of the high voltage circuit 150 and the disconnected components of the low voltage circuit 250. Accordingly, the electric currents that flow in the high voltage circuit 150 and in the low voltage circuit 250 may be configured through a combination of the housing 700 with the base 900. The electric currents that flow in the high voltage circuit 150 and in the low voltage circuit 250 may be obstructed by a separation of the base 900 from the housing 700.

Hereinbelow, the exemplary embodiments of the present invention will be described with reference to the accompanying drawings. FIG. 2 is an exemplary view showing in detail the plug unit of FIG. 1 according to an exemplary embodiment of the present invention. As shown in FIG. 2, the high voltage plug 500 may be mounted on the base 900 with the low voltage plug 800. Accordingly, when the base 900 is demounted from the vehicle, the high voltage plug 500 and the low voltage plug 800 may be simultaneously disconnected from the high voltage circuit 150 and the low voltage circuit 250. For example, the electric currents may be simultaneously obstructed from flowing in the high voltage circuit 150 and the low voltage circuit 250. Therefore, when the vehicle is maintained, the electric currents flowing in the high voltage circuit 150 and the low voltage circuit 250 may be obstructed by demounting the base 900 from the vehicle. In other words, the base 900 may be capable of connecting or disconnecting the terminals of the high voltage battery 100 to each other, and may be capable of connecting or disconnecting the terminals of the low voltage battery 200 to each other.

The high voltage plug 500 of the base 900 may include the high voltage connection components 610 electrically connected to the high voltage circuit 150. The low voltage plug 800 of the base 900 may include the low voltage connection components 630 electrically connected to the low voltage circuit 250. In particular, when the base 900 is combined with the housing 700, the high voltage connection components 610 and the low voltage connection components 630 may be respectively inserted into and connected to the disconnected components of the high voltage circuit 150 and the disconnected components of the low voltage circuit 250. Therefore, the electric currents may be configured to flow in the high voltage circuit 150 and the low voltage circuit 250.

Additionally, the disconnected components of the high voltage circuit 150 and the disconnected components of the low voltage circuit 250 may respectively include insertion protrusions 710 that extend toward associated plugs. Apertures 711 may be respectively disposed within the interior of the insertion protrusions 710. Accordingly, when the connection components 610 and 630 are respectively inserted into the apertures 711 the electric currents may be configured to flow in the high voltage circuit 150 and in the low voltage circuit 250. When the plugs 500 and 800 are separated from the housing 700, the electric currents configured to flow in the high voltage circuit 150 and in the low voltage circuit 250 may be obstructed. In other words, the high voltage plug 500 may be mounted on the base 900 with the low voltage plug 800 in an exemplary embodiment. The plugs 500 and 800 may be substantially similar to the connections components 610 and 630.

FIG. 3 is an exemplary view showing in detail the plug unit of FIG. 1 according to another exemplary embodiment of the present invention. As shown in FIG. 3, the low voltage plug 800 may be a switch. Accordingly, when the housing 700 is combined with the base 900, the switch may be turned on to allow the electric current to flow in the low voltage circuit 250. When the base 900 is separated from the housing 700, the switch may be turned off to obstruct the electric current flow in the low voltage circuit 250.

Additionally, FIG. 4 is an exemplary view showing in detail the plug unit of FIG. 1 according to another exemplary embodiment of the present invention. The low voltage plug 800 may be mounted at a low voltage base 270. Furthermore, the low voltage plug 800 may include the low voltage connection components 630 electrically connected to the low voltage circuit 250 and the housing 700 may be coupled to the main base 900. The low voltage base 270 may be disposed between the main base 900 and disconnected components of the low voltage circuit 250. For example, when the main base 900 is demounted from the vehicle, the low voltage base 270 may be configured to allow the electric current flow in the low voltage circuit 250. The mechanic may demount the low voltage base 270 from the vehicle to obstruct the electric current flow in the low voltage circuit 250.

FIG. 5 is an exemplary view showing in detail the plug unit of FIG. 1 according to another exemplary embodiment of the present invention. The main base 900 may include a rotary shaft 280 disposed in a center thereof. The high voltage plug 500 and the low voltage plug 800 may be disposed perpendicular to each other based on the rotary shaft 280. In particular, the low voltage plug 800 may include a rotating member 290 that protrudes in an upward direction from the main base 900. Accordingly, when a mechanic rotates the rotating member 290, the electric current flowing in the low voltage circuit 250 may be obstructed.

According to the plug unit for the vehicle having the structure as described above, the plug unit may be disposed at a position that improves access to the plug unit during maintenance of the vehicle. To protect the mechanic from electric shock caused by the high voltage battery, the high voltage plug that obstructs high voltage lines may be included and modularized with the low voltage plug that obstructs the ground line of the 12 V auxiliary battery that has a relatively low voltage. Therefore, during the maintenance of the vehicle, the electric currents that flow in the high voltage circuit and the low voltage circuit may be simultaneously or selectively obstructed by a mechanic by demounting the plug unit to improve safety during maintenance operations and work efficiency.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A plug unit for a vehicle, comprising:
   a low voltage plug detachable from a low voltage circuit formed by a low voltage battery and a low voltage component of the vehicle, and configured to allow an electric current to flow between the low voltage battery and the low voltage component when the low voltage plug is connected to the low voltage circuit;
   a high voltage plug detachable from a high voltage circuit formed by a high voltage battery and a high voltage component of the vehicle and configured to allow an electric current to flow between the high voltage battery and the high voltage component when the high voltage plug is connected to the high voltage circuit; and
   a main base on which the high voltage plug is mounted, configured to allow the electric currents to flow in the high voltage circuit and in the low voltage circuit when the main base is disposed in the vehicle, and configured to obstruct the electric current from flowing in the high voltage circuit when the main base is demounted from the vehicle,
   wherein the main base includes a rotary shaft disposed in a center thereof, and the high voltage plug and the low voltage plug are perpendicular to each other based on a position of the rotary shaft, and the low voltage plug includes a rotating member that protrudes in an upward direction from the main base, to obstruct the electric current flow in the low voltage circuit when the rotating member rotates about the rotary shaft.

2. The plug unit of claim 1, wherein the low voltage plug is mounted on the main base with the high voltage plug, to simultaneously obstruct the electric currents respectively flowing in the high voltage circuit and in the low voltage circuit when the main base is demounted from the vehicle.

3. The plug unit of claim 2, wherein the low voltage plug includes low voltage connection components connected to the low voltage circuit.

4. The plug unit of claim 3, wherein the low voltage circuit includes a negative line that extends therefrom, and the low voltage connection components are connected between the low voltage battery and the negative line, configured to allow the electric current to flow in the low voltage circuit and configured to obstruct the electrical current in the low voltage circuit when the low voltage connection components are disconnected from the low voltage battery and the negative line.

5. The plug unit of claim 2, wherein the high voltage circuit includes, disconnected components and the low voltage circuit includes disconnected components, and wherein a housing surrounding both the disconnected components of the high voltage circuit and the disconnected components of the low voltage circuit, and the main base is configurable with the housing.

6. The plug unit of claim 5, wherein the main base includes connection components configured to be respectively electrically connected both to the high voltage circuit and to the low voltage circuit, and when the plugs are coupled to the housing, the connection components are respectively disposed within and coupled to the disconnected components of the circuits, and to allow the electric current to flow within the circuits.

7. The plug unit of claim 6, wherein the disconnected components of the circuits respectively include insertion protrusions that extend toward associated plugs, with apertures disposed within the insertion protrusions, and the connection components are configured to be disposed within the apertures.

8. The plug unit of claim 1, wherein:
the low voltage plug is a switch, and the switch is configured to turn on to allow the electric current to flow in the low voltage circuit when the main base is disposed in the vehicle, and the switch is configured to turn off to obstruct the electric current in the low voltage circuit when the main base is demounted from the vehicle.

9. The plug unit of claim 1, wherein the low voltage plug is mounted at a low voltage base, and includes low voltage connection components electrically connected to the low voltage circuit.

10. The plug unit of claim 9, wherein the low voltage base is disposed between the main base and disconnected components of the low voltage circuit and the low voltage base is configured to allow the electric current to flow in the low voltage circuit when the main base is demounted from the vehicle+.

11. The plug unit of claim 1, wherein the high voltage plug is disposed between a plurality of high voltage batteries that are connected in series in the high voltage circuit.

12. The plug unit of claim 1, wherein the high voltage plug is disposed between the high voltage battery and the high voltage component.

13. The plug unit of claim 1, wherein the high voltage plug includes high voltage connection components connected to the high voltage circuit.

14. The plug unit of claim 13, wherein:
the high voltage circuit includes a positive line and a negative line that extend from the high voltage circuit, and when the high voltage connection components are respectively connected to the positive line and the negative line, the high voltage connections components are configured to allow the electric current to flow in the high voltage circuit, and configured to obstruct the electric current flow in the high voltage circuit when the high voltage connection components are disconnected from the positive line and the negative line.

15. The plug unit of claim 1, wherein the low voltage plug is disposed between the low voltage battery and a ground.

* * * * *